(12) United States Patent
Gallup et al.

(10) Patent No.: US 10,322,504 B2
(45) Date of Patent: Jun. 18, 2019

(54) TOOL FOR USE WITH SHIPPING CONTAINERS AND METHODS OF USING THE SAME

(71) Applicant: Atlas Devices, LLC, Boston, MA (US)

(72) Inventors: Benjamin Gallup, Medford, MA (US); Daniel Walker, Malden, MA (US); Gino Kahaunaele, Durham, NC (US); Nathan Ball, Somerville, MA (US)

(73) Assignee: ATLAS DEVICES LLC, Boston, MA (US)

( * ) Notice: Subject to any disclaimer, the term of this patent is extended or adjusted under 35 U.S.C. 154(b) by 36 days.

(21) Appl. No.: 15/603,390

(22) Filed: May 23, 2017

(65) Prior Publication Data

US 2017/0334061 A1 Nov. 23, 2017

Related U.S. Application Data

(60) Provisional application No. 62/340,502, filed on May 23, 2016.

(51) Int. Cl.
*B25J 1/00* (2006.01)
*B65D 90/00* (2006.01)

(52) U.S. Cl.
CPC ............ *B25J 1/00* (2013.01); *B65D 90/0026* (2013.01)

(58) Field of Classification Search
CPC ....... B25J 1/00; B25J 1/02; B25J 1/04; B65D 90/0026; B65D 90/0033; B25F 1/02; B25F 1/04; A01B 1/20; A01B 1/22; A47F 13/06
USPC .......... 294/209, 51, 210, 191, 175; 182/230, 182/189; 7/167; 248/925
See application file for complete search history.

(56) References Cited

U.S. PATENT DOCUMENTS

| 154,018 | A | * | 8/1874 | Cassiano | A01B 1/022 |
| | | | | | 294/51 |
| 2,932,537 | A | * | 4/1960 | Wolfe | A01B 1/20 |
| | | | | | 294/51 |
| 4,068,878 | A | | 1/1978 | Wilner | |
| 4,108,326 | A | | 8/1978 | Bertolini | |

(Continued)

OTHER PUBLICATIONS

Invitation to Pay Additional Fees for Application No. PCT/US2017/034090, dated Aug. 7, 2017 (2 Pages).

(Continued)

*Primary Examiner* — Gabriela M Puig
(74) *Attorney, Agent, or Firm* — Nutter McClennen & Fish LLP

(57) ABSTRACT

Devices and methods for creating a secure overhead anchor from which to perform tasks such as climbing, hauling, lifting, and rescuing tasks with respect to shipping containers (e.g., intermodal containers) are described herein. The disclosure relates to a device that can be placed, for example, into corner castings on standardized shipping containers at a distance, for example by a pole or other comparable component, and which can securely fit into the standardized corner castings of a shipping container even when a twistlock device or similar component is installed in the casting to hold the target container to another container above or below it. A head of the device can be rotated between a first configuration for inserting the device into the casting, and a second configuration for securing the device to the casting. Methods of using the device are also provided.

24 Claims, 10 Drawing Sheets

(56) References Cited

U.S. PATENT DOCUMENTS

| | | | |
|---|---|---|---|
| 4,341,495 A | 7/1982 | Del'Acqua | |
| 4,648,764 A | 3/1987 | Pavlick | |
| 4,700,420 A | 10/1987 | Belanger | |
| 5,346,268 A | 9/1994 | Baker et al. | |
| 6,164,862 A | 12/2000 | Takaguchi | |
| 6,267,424 B1 | 7/2001 | Gillette | |
| 6,526,619 B1* | 3/2003 | Cassels, Jr. | E04D 13/0765 15/144.1 |
| 7,010,822 B1* | 3/2006 | Lin | B25F 1/006 7/143 |
| 8,419,098 B1* | 4/2013 | Smith | E04H 4/1281 294/209 |
| 8,469,425 B1* | 6/2013 | Lofley, Sr. | B25G 1/04 294/175 |
| 8,469,427 B1* | 6/2013 | Mejia | B66F 19/00 294/209 |
| 2010/0109357 A1* | 5/2010 | Lofley, Sr. | B25G 1/04 294/210 |
| 2010/0207407 A1* | 8/2010 | Walker, Jr. | B01D 46/4227 294/210 |
| 2013/0042958 A1* | 2/2013 | Spindler | F21V 21/0808 156/66 |

OTHER PUBLICATIONS

International Search Report and Written Opinion for Application No. PCT/US2017/034090, dated Oct. 23, 2017, with Correction mailed Jan. 4, 2018 (11 pages).

* cited by examiner

TOOL FOR USE WITH SHIPPING CONTAINERS AND METHODS OF USING THE SAME

CROSS REFERENCE TO RELATED APPLICATIONS

This application claims benefit under 35 U.S.C. § 119(e) of U.S. Provisional Patent Application No. 62/340,502, filed May 23, 2016, and incorporated by reference herein in its entirety.

FIELD

The present disclosure relates to a tool for using with shipping containers, along with methods of using the same, and more particularly relates to a tool that can be used to perform tasks such as climbing, hauling, lifting, and rescuing shipping containers.

BACKGROUND

Steel shipping containers are often used in intermodal freight transport. Intermodal freight transport can include the transport of steel shipping containers across different modes of transportation including cargo ships, trucks, and railroads. Steel shipping containers can additionally offer secure and standardized means of moving cargo around the world. Such containers can be stacked many levels high both on land and at sea. Circumstances can arise when either random, or specific, containers must have their contents inspected or examined. However, when a target container is in or atop a stack, located high above the ground or deck, accessing the inside can present a formidable challenge. Due to the heights involved, ladders are not practical or useful. Further, at-sea, on cargo ships, conventional height access devices such as personnel lifts are often not safe, useful, and/or practical.

Intermodal containers are used worldwide, and while they have different sizes and shapes, those sizes and shapes generally fall within a small set of worldwide, standardized sizes and shapes. Likewise, intermodal containers often have similar characteristics and components. For example, intermodal containers typically include corner castings to assist in performing various actions related to the containers. A corner casting is typically attached to, or formed as part of, one or more corners of an intermodal container. A casting often includes one or more holes or apertures formed in the casting to allow tools, poles, ropes, and other devices to be removably coupled to the intermodal container when performing various tasks with respect to the container, such as accessing and/or moving the container.

Existing methods for a person to access a high-up container can present a number of challenges. Those existing methods can include lead climbing the front faces of the containers and using ropes and other climbing equipment to protect the climber in the case of a fall, magnetic climbing systems that allow users to scale directly up the ferromagnetic surfaces of the container stack, or using an elongate pole, telescoping or otherwise, to place a hook with a ladder or rope hanging from it, which the climber can then use to access the upper levels. The methods can be difficult to perform and can be prone to undesirable failure, among other drawbacks.

Hook placement methods may offer the best mix of affordability and flexibility, as the topmost corner castings on a container stack are typically open on the top and a hook can be placed into the upper opening by using an elongate pole. Any anchor attachment to a corner casting can provide a climber with excellent confidence in safety, as the corner castings designed to withstand heavy loads in multiple directions. However, this method of hooking the top casting can still present the user with limited and risky options. Most climbing hooks cannot be safely side-loaded into side face openings of the casting, and if the user were to load the hook in any direction except straight down, the loads imparted on the hook would drastically reduce its strength and safety. In some cases, even pulling straight down on the hook may overload it due to the hook's interaction with the shape of the corner casting and the resulting load concentrations that would ensue.

Further, twistlock devices can be placed into the corner castings of stacked containers and can be engaged and disengaged, allowing the containers to physically interlock with each other to provide safety and stability for a stack on the ground or at sea. In any stack of containers, only the uppermost casting opening would be empty, meaning a climbing hook will not fit into any of the other corner attachments at lower levels. This limits options for an inspection team to be able to reach an arbitrary target container easily and safely. Further still, even if a topmost corner casting is a suitable target, a user may not be able to reach that target if their placement pole is not long enough.

It is therefore an object of the present disclosure to provide a device or tool that can be securely and retrievably placed into any corner casting in a stack of shipping containers from a distance away, whether or not a twistlock device is installed in the target corner attachment. This can enable climbers to choose any casting in any stack as a safe overhead anchor point from which to climb or perform other actions with respect to intermodal containers.

Other objects and advantages of the present disclosure will be apparent to one of ordinary skill in the art in light of the ensuing description of the present disclosure. One or more of these objectives include:

(a) to provide a device that can be placed from a distance securely into any shipping container corner attachment point using a pole (or equivalent), telescoping or otherwise, to create a tool, e.g., an anchor, suitable for pulling or climbing;

(b) to provide a device that can be retrieved from its secure engagement with a container's corner load point from some distance away;

(c) to provide a device that will remain firmly and securely in place, engaged with a container's corner load point, even when loads are applied;

(d) to provide a device that will self-correct to a safe engagement with a container's corner load point when loads are applied to the device within a range of directions; and (e) to provide a device that can create a useful anchor when engaged with any shipping container's corner castings, even when the target casting has a twistlock device installed.

SUMMARY

This disclosure relates to a device, i.e., tool (sometimes referred to as an anchor), that can create a secure overhead anchor from which to perform climbing, hauling, lifting, and rescuing tasks (among other tasks) with respect to shipping containers (e.g., intermodal containers), as well as methods for using the same. More particularly, the disclosure relates to a removable tool that can be placed, for example, into corner lifting points (e.g., castings) on standardized shipping containers (also known as iso containers, cargo or freight containers, sea or ocean containers, container vans, conex boxes, intermodal containers, and sea or c cans, among other names) by a user from a significant distance away from the corner. For example, the user may utilize a telescoping pole or other comparable component to advance a distal end of the tool to the casting located at a corner of the container. The distal end of the tool can be configured to be manipulated to pass into the casting and further configured to be adjusted to allow it to securely lock into the casting of the container. As designed, this secure attachment can be achieved even when a twistlock device or similar component is already installed in the casting to hold the target container to another container above or below it. Once the tool is secured to the casting, the user, or another party, can perform a variety of tasks related to the container, including but not limited to climbing, hauling, lifting, and rescuing.

Various features of the tool, and related methods of use, accomplish one or more objects of the disclosure provided for above. For example, the tool of the present disclosure can include features on its distal end (e.g., a head of the tool) that removably interlock with a corner casting of a storage container to create a secure fixation between the tool and the storage container, and features at its proximal end (e.g., an engagement adapter or handle of the tool) that removably interlock with a placement pole or other similar component held by a user to control the engagement of the tool with a corner casting from a desired distance away from the storage container. Other features of the tool can include those that allow an additional tool, device, or other component (e.g., rope or chain) to be associated with the head to help manipulate the head between different configurations. For example, a hole or aperture can be formed in a head of the tool, with the aperture being configured to receive components such as a carabiner, rope, ladder, or other object to allow a force to be applied to the head to move the head to a different configuration. The different configurations can be such that the head has one orientation when being passed through the casting and a second orientation when engaging the casting to create a secure fixation between the tool and the container. Additionally, or alternatively, the aperture (or other feature) can be used in conjunction with performing many different tasks with relation to the containers, such as climbing, hauling, lifting, and rescuing.

The device can further include components such as pivots and springs that enable easy movement between various head configurations and/or easy association with placement poles, ropes, etc. that are used in conjunction with the tool. The device can further include features that keep the tool at a fixed location once the head is properly oriented to secure a position of the tool with respect to the container (e.g., its location and/or orientation), thereby resisting the impacts of loads imparted upon the tool during subsequent use. Further aspects of the present disclosure will become clear from the detailed description below.

In one exemplary embodiment, a tool includes a head, a plate, an engagement adapter (e.g., a rod), and a biasing element (e.g., a torsional spring). The head includes an attachment end with one or more engagement features configured to engage an object to set a position of the head with respect to the engaged object, and an opposed control end with an aperture extending through opposed first and second faces of the head. The first and second faces have the largest surface areas of all faces of the head. The plate includes opposed first and second faces of its own. The first and second faces of the plate likewise have the largest surfaces areas of all faces of the plate. The plate is fixedly disposed with respect to the first face of the head such that an angle formed between the first face of the head and the first face of the plate is greater than 0 degrees and less than or equal to 90 degrees. The engagement adapter has a distal end to which the plate is pivotally coupled, and the biasing element is disposed on a portion of the engagement adapter. The biasing element is configured to apply a force to at least one of the head, the plate, and the engagement adapter. The head is configured to be pivoted between a first configuration in which a plane defined by the first face of the head is substantially parallel to a longitudinal axis of the engagement adapter, and a second configuration in which the plane defined by the first face of the head forms an approximate right angle with the longitudinal axis of the engagement adapter.

In some embodiments, the plate can further include both an aperture and a channel formed in the plate, with each extending through the opposed first and second faces of the plate. In such embodiments, the engagement adapter can further include a pivot and a pin. The pivot can be disposed through the aperture of the plate and the pin can be disposed in the channel of the plate such that the pin moves from a first location of the channel to a second location of the channel as the head moves from the first configuration to the second configuration. The channel can be an arcuate channel and the first and second locations can be respective first and second terminal ends of the channel. The biasing element can be disposed on the pivot of the engagement adapter. In some embodiments, the biasing element is a torsional spring. In some embodiments, the engagement adapter is a rod or has a shape of a rod.

The tool can further include a rope disposed through the aperture of the head, with the rope being operable to apply a force to the head to pivot the head from the first configuration to the second configuration. In some embodiments, the head can include at least one tab. The tab(s) can have a terminal end(s) that extends away from the second face of the head in a direction that is opposite to a direction from which a terminal end of the plate extends away from the first face of the head. A third face of the plate that extends between the first and second faces of the plate can include a rounded corner formed on the face. The rounded corner can be disposed adjacent to the at least one tab.

The head and engagement adapter can have various configurations. For example, a proximal end of the engagement adapter can be configured to be removably and replaceably coupled to an elongate pole (or the equivalent). The one or more engagement features of the attachment end of the head can further include opposed hooked ends in which a distance extending between terminal ends of the opposed hooked ends is greater than a more proximal width of the first face of the head. The more proximal width of the first face can be measured in the same direction along which the distance extending between the terminal ends of the opposed hooked ends are measured.

In another exemplary embodiment, a tool can include a head that is pivotally coupled to an engagement adapter. More particularly, the head has a first portion that includes an attachment end with one or more engagement features configured to engage an object to set a position of the head with respect to the engaged object, and a second portion that includes a coupling end, with the coupling end including an arcuate channel formed in a surface of the head. The engagement adapter has a pivot and a pin, with the pivotal coupling between the head and the engagement adapter being such that the head and engagement adapter are coupled at the coupling end of the head with the head pivoting about the pin. Further, the pin is disposed in the arcuate channel such that the pin is configured to move from a first terminal end of the arcuate channel to a second opposite terminal end of the arcuate channel, causing the coupling end to rotate about the pivot between approximately 30 degrees and approximately 90 degrees.

The head can include a first plate that includes at least a portion of the attachment end and a second plate that is angularly disposed with respect to the first plate. The second plate can include at least a portion of the coupling end. An angle formed between a face of the first plate and a face of the second plate can be greater than 0 degrees and less than or equal to 90 degrees. The faces of the first and second plates can be faces that face each other and include one of the two faces of each plate that has the greatest surface area of the faces for that particular plate. In some embodiments, the head can include at least one tab extending from a surface of the first plate. The at least one tab can have a terminal end that extends away from the surface of the first plate in a direction that is opposite to a direction from which a terminal end of the second plate extends away from the face of the first plate. In some embodiments, the second face of the first plate that extends substantially perpendicular to the first face of the first plate can include a rounded corner. The rounded corner can be disposed adjacent to the at least one tab.

The tool can include a biasing element (e.g., a torsional spring) that is disposed on the pivot and that is configured to apply a force to at least one of the head and the engagement adapter. This can bias the head into a particular configuration, such as a placement or insertion configuration. The first portion of the head can include a hole or aperture formed in it, with the aperture being disposed closer to the coupling end of the head than the attachment end of the head. The aperture can extend through a thickness of the head and can be configured to receive an object through it, the object being for applying force to the head to move the pin between the first and second terminal ends of the arcuate channel. In some embodiments, the tool can include a rope disposed through the aperture. The rope can be operable to apply a force to the head to move the pin from the first terminal end of the arcuate channel to the second terminal end of the arcuate channel. A proximal end of the engagement adapter can be configured to be removably and replaceably coupled to an elongate pole. The one or more engagement features of the attachment end can include opposed hooked ends.

Exemplary methods of engaging an intermodal container with a tool are also disclosed. One exemplary method includes inserting a head of a tool into an opening extending through one face of a corner casting of an intermodal container. The casting generally has a hollow portion into which at least a portion of the head passes after being inserted into and through the opening. The method further includes rotating the head of the tool with respect to a height of the casting by at least about 30 degrees such that a width of the head is approximately perpendicular to the height of the casting after having been in a different position with respect to the height of the casting during insertion of the head into the opening. The method is further performed by engaging an attachment end of the head with an internal surface of the casting that is adjacent to the opening extending through the one face. The internal surface of the casting is substantially opposed to the one face.

In some embodiments, rotating the head of the tool with respect to a height of the casting by at least about 30 degrees includes rotating the head of the tool approximately 90 degrees with respect to the height of the casting. The head of the tool can be pivotally coupled to an engagement adapter (e.g., a rod), and a longitudinal axis of the engagement adapter can be approximately parallel to the height of the casting during the step of inserting the head into the opening such that the width of the head is approximately parallel to the height of the casting during insertion of the head into the opening of the casting. In other embodiments, the longitudinal axis of the engagement adapter can be disposed at an angle with respect to the height of the casting such that it is diagonally disposed to the height of the casting. The engagement adapter can be removably coupled to a pole during the steps of inserting the head into the opening extending through one face of the casting, rotating the head of the tool with respect to the height of the casting, and engaging the attachment end of the head with the internal surface of the casting that is adjacent to the opening extending through the one face. In such embodiments the method can include detaching the engagement adapter from the pole and using the engagement adapter to climb closer to the intermodal container. In embodiments that include an engagement adapter, the method can include rotating the engagement adapter with respect to the height of the casting such that the longitudinal axis of the engagement adapter is approximately perpendicular to the height of the casting.

The step of rotating the head of the tool with respect to a height of the casting can include applying a force to the head by way of a rope coupled to the head to cause rotation of the head of the tool. In some embodiments, the step of rotating the head of the tool with respect to a height of the casting can include moving a pin associated with an engagement adapter pivotally coupled with the head from a first location of a channel formed in a plate of the head to a second location of the channel. Further, in some embodiments, the engagement adapter can be removably coupled to a pole (or equivalent) during any or all of the steps of inserting the head into the opening extending through one face of the casting, rotating the head of the tool approximately 90 degrees with respect to the height of the casting, and engaging the attachment end of the head with the internal surface of the casting that is adjacent to the opening extending through the one face. The method can further include detaching the engagement adapter from the pole and using the engagement adapter to climb closer to the intermodal container, among other actions that can be performed.

Unless otherwise specified, the steps of the methods provided for in the present disclosure can be performed in any order.

DETAILED DESCRIPTION

Figure 1A:
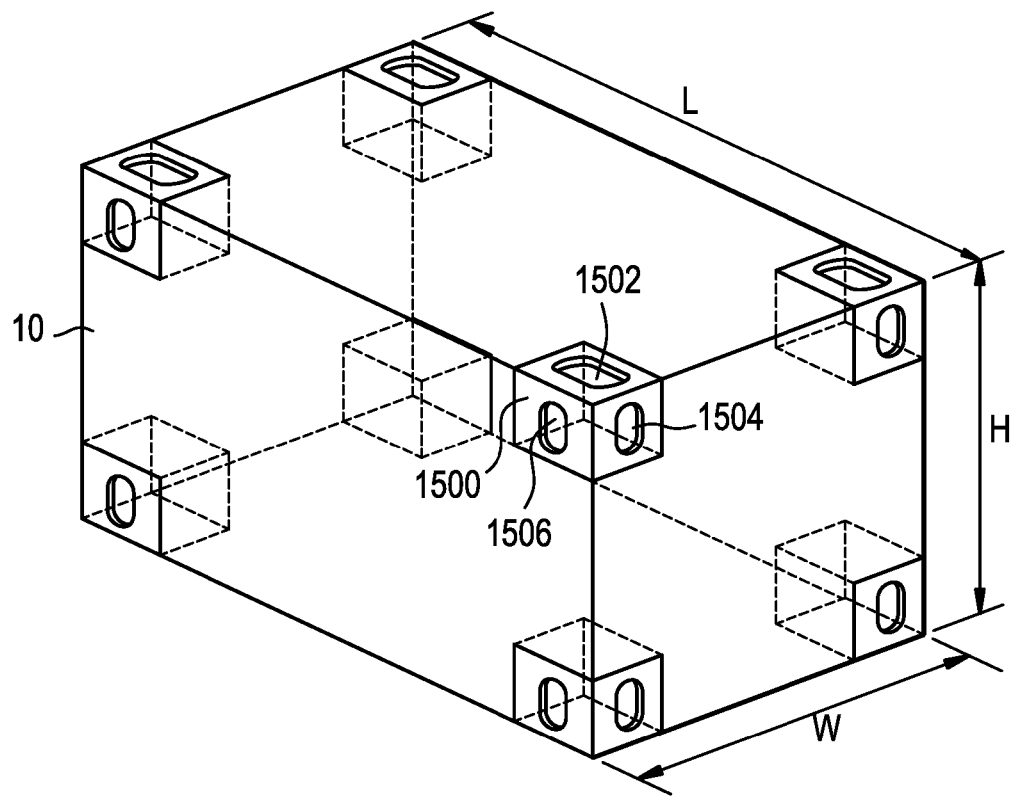
FIG. 1A is a perspective view of one exemplary embodiment of a shipping container having a plurality of castings as is known in the prior art.

Certain exemplary embodiments are described to provide an overall understanding of the principles of the structure, function, manufacture, and use of the systems, devices, and methods disclosed herein. One or more examples of these embodiments are illustrated in the accompanying drawings or otherwise described in the materials provided herein. Those skilled in the art will understand that the systems, devices, and methods specifically described herein and illustrated in the accompanying drawings are non-limiting exemplary embodiments.

The terms "proximal" and "distal" are used herein with reference to an operator or user of the device holding a handle, pole, or other object to manipulate the attachment end, or head, of the device. The term "proximal" refers to the portion closest to the operator and the term "distal" refers to the portion located away from the operator (e.g., the attachment or anchoring end). With respect to the present disclosure, a person skilled in the art will recognize that a plane that is defined by a face of a given structure can be understood to be a plane through which the topical surface of the structure substantially extends through. To the extent a structure or reference point (e.g., a plane or axis) is described as having a particular orientation with respect to some other structure or reference point, it does not mean that the respective structures and/or reference points necessarily have that particular orientation on the structure or related structure having that reference point. By way of example, if a plane of a structure as defined above is described as being substantially perpendicular to an axis of the same, or a different, structure (or a face or another plane of the same, or a different, structure), it does not necessarily mean that the plane and axis themselves intersect within the structure(s). While the plane and axis may intersect within the structure (s), a person skilled in the art will understand that such a description may also cover instances in which either or both of the plane and the axis would have the described orientation if either or both of the plane and axis were extended into space. Further, one of ordinary skill in the art will understand that a description of one structure (or related reference point) being substantially perpendicular to another can encompass embodiments where those structures (or related reference points) are not truly at a perpendicular angle to one another. They can be a little greater or less than perpendicular as appropriate, which will be determinable by a person skilled in the art in view of that person's knowledge and the present disclosures. The use of terms such as first, second, third, etc. with respect to surfaces or steps of a method are relative terms and are not intended to limit the scope of the structures and/or methods that they are referencing. The features illustrated or described in connection with one exemplary embodiment may be combined with the features of other embodiments. Such modifications and variations are intended to be included within the scope of the present disclosure.

The present disclosure is generally directed to a tool that can be effectively used with shipping containers (e.g., intermodal containers) to perform various functions, such as climbing, hauling, lifting, and rescuing, among others. It also provides for various methods of using such a tool. The tool or device, sometimes referred to an "axe" or "ConAxe" based on its shape and use with containers, generally includes a head portion that is used to engage with a container and a an engagement adapter (as described herein a rod, although other shapes and configurations are possible) that can be used to help a user control the head portion. As described herein, the head is rotatable with respect to the engagement adapter to aid in locating the head portion with respect to the container and then subsequently engaging the head portion with the container, thereby setting a position of the tool with respect to the container. The position of the tool can be its location and/or its orientation with respect to the container. The engagement adapter can be further associated with another pole or other object that allows a user to control the head portion from an even greater distance away. Although the present disclosure focuses on the use of the disclosed embodiments of such a tool in conjunction with shipping containers, a person skilled in the art will recognize that the disclosures related to the tool and its use can be adopted for use with other structures or objects, as well as in conjunction with other methods, without departing from the spirit of the present disclosure.

To help understand how the disclosed tool can be used in conjunction with shipping containers, it is helpful to first describe typical shipping containers. Shipping containers, also referred to as intermodal containers among many other names provided for herein or otherwise known to those skilled in the art, are routinely transported worldwide through a variety of different modes of transport. The various modes of transportation can include ships, rail, trucks, cranes, etc. One exemplary embodiment of a shipping container is provided for in FIG. 1A. As shown, shipping containers can have a length L, a width W, and a height H. While shipping containers can have different sizes, and the present disclosed tool can be used and/or adapted for use with different sized containers, at least in some instances the dimensions of standard shipping containers 10 are governed by standards set by the International Organization for Standardization (ISO). For example, some common configurations for intermodal containers include containers have a length L approximately in the range of about 10 feet to about 60 feet, a width W of approximately in the range of about 8 feet to about 12 feet, and a height H approximately in the range of about 8 feet to about 12 feet. Many intermodal containers used globally are referred to as "dry freight" or "general purpose" containers, are made of steel, and have a length L of either 20 feet or 40 feet, a width W of 8 feet, and a height H of either 8 feet, 6 inches or 9 feet, 6 inches. In certain embodiments, the length L of the shipping container 10 can be related to the height H of the container 10 and/or the width W of the container 10. The dimensions provided for the container 10 provided for herein are by no means limiting, and are intended to just provide some examples of typical intermodal container sizes.

Figure 1B:
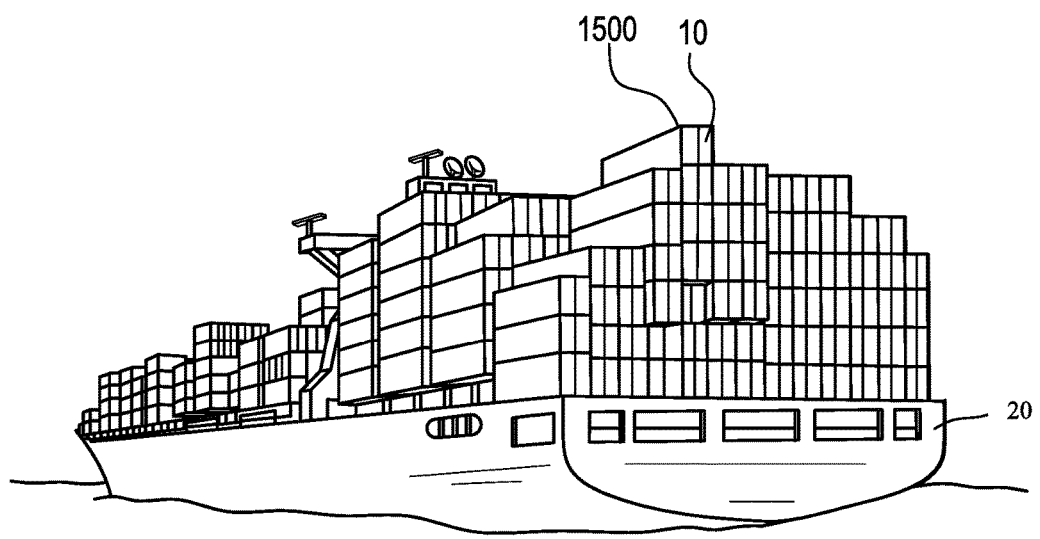
FIG. 1B is a perspective view of one exemplary embodiment of a plurality of shipping containers on a sea vessel, as known in the prior art.

Because these containers are transferred between the various modes of transportation, often the shipping containers have standard castings, or corners 1500, to assist in grabbing and moving (or otherwise transporting) the containers. As shown in FIG. 1A, the standard castings often have two to three exposed faces which include openings 1502, 1504, 1506 for various types of locks or engagement devices. Similar to the containers, the castings can have various sizes, and the tool provided for herein, which can be used to engage the castings, can be sized and adapted accordingly. In some exemplary embodiments, the top opening 1502 of the casting 1500 can be approximately 2.5 inches wide and approximately 5 inches long, while the openings 1504, 1506 on the side faces of the casting 1500 can be approximately 2 inches wide and approximately 3 inches high. Other configurations (i.e., differently shaped and sized openings in the same or different locations on the casting) and sizes are certainly possible without departing from the spirit of the present disclosure, depending, at least in part, on the size of the container with which it is associated and the size and shape of the tool and other devices with which the castings are to be used (e.g., the tool of the present disclosure and twistlock devices, which are known to those skilled in the art; a twistlock in combination with a casting like the casting 1500 form a standardized rotating connector for securing shipping containers). These standard castings can be used to load or unload the containers from a given mode of transport. Further, the castings can be used to lock together containers when they are stacked together many containers high. Stacks of containers 10' can have heights in excess of 70 feet, as shown, for example in FIG. 1B. If one container 10' that is further up the stack needs to be inspected, or otherwise opened, reaching the higher level containers can be difficult. Further, in the case where the containers 10' are stacked on a boat 20, conventional mechanical lifts may not be suitable due to size restrictions or other safety concerns. However, there remains a need to safely and easily reach higher level containers in a variety of situations.

Figure 2:
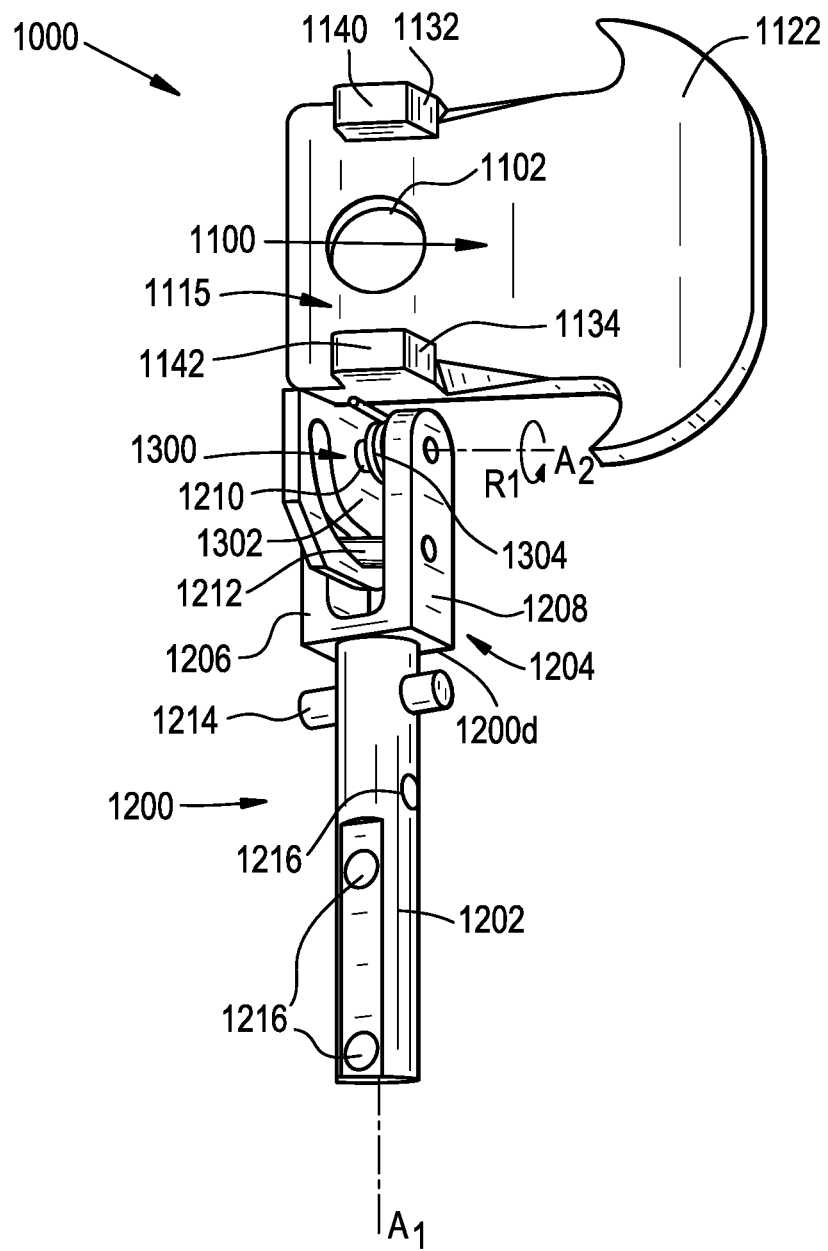
FIG. 2 is a perspective view of one exemplary embodiment of a tool in accordance with the disclosures provided for herein, the tool being capable of being used in conjunction with shipping containers like those provided for in FIGS. 1A and 1B, among other objects.

One exemplary embodiment of a tool or device 1000 for creating a secure overhead anchor is illustrated in FIG. 2. As shown, the tool 1000, which may be referred to as container anchor device or anchor, among other names, can include an anchor engagement portion, or head, 1100 and an engagement adapter, e.g., rod, 1200. The rod 1200 can be pivotally connected to the head 1100 with a pivot hinge 1300. The head 1100 can be sized and shaped, as discussed further below, to be received through an opening in a standard casting 1500 when the head 1100 is in a first orientation or configuration (FIGS. 4B and 4C), also referred to herein as a placement or insertion position/orientation/configuration, and engaged with an internal surface of the casting when the head 1100 is in a second orientation or configuration (FIG. 4D), also referred to as an engagement position/orientation/configuration. As described below, in some embodiments the first and second orientations or configurations can involve rotation of the head 1100 with respect to the rod 1200 by approximately 90 degrees, although other angles of rotation (e.g., any angle approximately in the range of about 20 degrees to about 90 degrees) can also be used.

Figure 3:
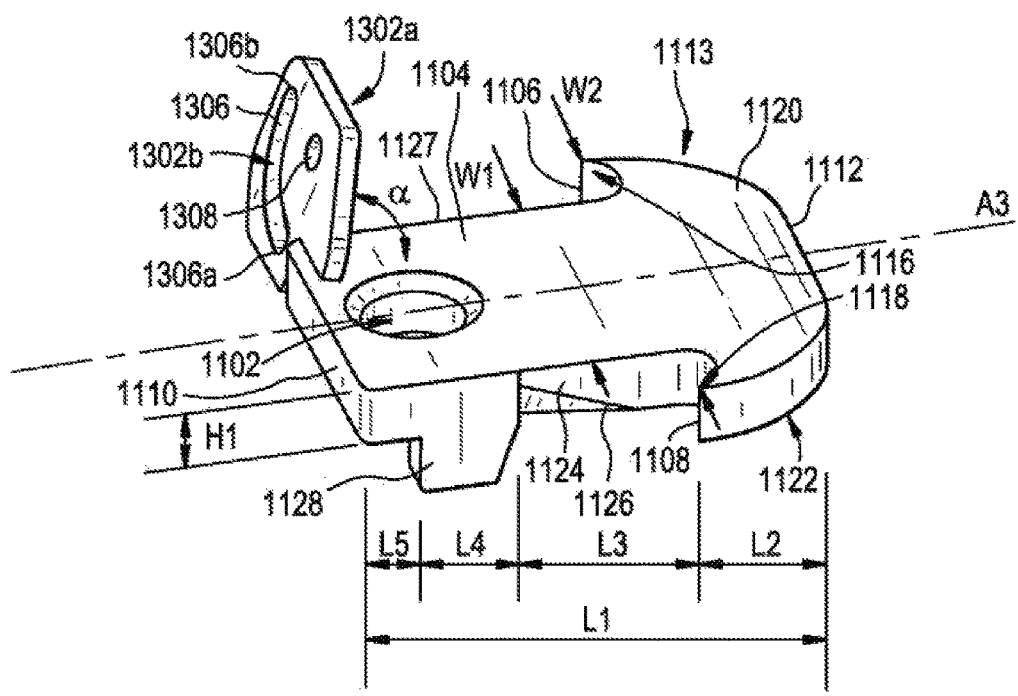
FIG. 3 is a perspective view of a head and a plate of the tool of FIG. 2.

Referring now to FIGS. 2 and 3, the head 1100 has a first plate or body 1104 and a second plate 1302 that are oriented at an angle with respect to each other. The second plate 1302 may be considered as a separate component that is not necessarily part of the head 1100, while in other instances the plate 1302 can be considered a portion of the head 1100. The body 1104 includes a plurality of faces, including a first face 1120 and an opposed second face 1122 (not visible). As shown, the first and second faces 1120, 1122 have the largest surface area of all surfaces of the body 1104, and of the head 1100 more generally. In some embodiments, the faces 1120, 1122, or other portions of the body 1104, can have lightening holes formed therein to lighten the weight of the body. When lightening holes or the like are formed in the body, a person skilled in the art will understand that the faces 1120, 1122 can still generally be considered to have the largest surface area of all surfaces of the body, as the formation of the lightening holes, at least with respect to the present disclosure, are not considered to impact the definition of the surface area.

The body 1104 includes a length L1 extending from a proximal-most end 1110 (i.e., an end that is closer to where the tool is controlled, the end generally being referred to herein as a control end) to a distal-most end 1112 (i.e., an end that is closer to where the tool is configured to engage a casting, the end generally being referred to herein as an engagement, anchoring, or attachment end) along a longitudinal axis A3. The body 1104 also includes a height H1, also referred to as thickness of the body 1104, which extends between the opposed first and second faces 1120, 1122, and a width that changes with respect to the length. More particularly, the body 1104 includes an anchor shape (sometimes referred to as a T-shape) having two hooked engagement features 1106, 1108 having top corners 1116, 1118 that face towards the proximal end 1110 of the head 1100 to facilitate engagement with a casting. Accordingly, a width W2 defined by the top corners 1116 and 1118 is greater than a width W1, although as shown there are a variety of widths along the length of the body 1104 because of the shape of the body 1104. A length L2 of this portion of the distal end of the tool 1000 can be such that it is configured to extend into the casting so it can later be engaged with an internal surface that is adjacent to the opening through which the head 1100 is inserted.

Additional faces include a third face 1124 and a fourth face 1127 (not visible) that extend between the first and second faces 1120, 1122 to help define a volume of the head 1100. As shown, the third face 1124 includes a rounded edge or corner 1126 disposed adjacent to the tab 1128, which can aid in placement of the head 1100 in a casting during use, as described further below. The rounded edge 1126 can extend for a portion of a length L3 of the head 1100 or along the entire length L3. A similar rounded edge or corner can be associated with the fourth face 1127. In an alternative embodiment, the rounded corner 1126 can be a chamfered edge or a square edge, among other shaped configurations.

The head 1100 can include additional features that assist in placing and securing the tool 1000 with respect to a casting. For example, the head 1100 can include one or more features for receiving an additional component that is designed to assist in moving the head between the aforementioned first and second orientations. As shown, an attachment point, sometimes referred to herein as an aperture or through hole, 1102 extends through a thickness of the body 1104 at a location that is more proximate to the proximal-most end 1110 than the distal-most end 1112, thus providing good leverage, and is configured to receive components such as a rope, chain, or other object that can be associated with the head 1100 to apply a force to the head to move it between the aforementioned first and second orientations. The attachment point 1102 can also be used for other purposes, such as to be a universal clip-in point or to be otherwise engaged by objects such as ropes, chains, carabiners, and caving ladders, among others, when other actions are being performed relative to the tool 1000.

Another provided for feature that assists in placing and securing the tool 1000 with respect to a casting are tabs 1128, 1130, which extend from the second face 1122. The tabs 1128, 1130 can include respective terminal ends 1140, 1142 that extend away from the second face 1122 of the head 1100. As shown, the direction that the tabs 1128, 1130 extend can be generally opposite to the direction that the plate 1302 extends from the head 1100, although many other configurations are possible. As shown in FIG. 3, the tabs 1128, 1130 extend proximally a length L4 from the rounded edges 1126, and can be spaced from the proximal most edge 1110 of the head 1100 a length L5. The tabs 1128, 1130 can include respective angled faces 1132, 1134 that can engage an outer face of a casting of a container, as described further below. A person skilled in the art will recognize that the tabs 1128, 1130 can have a variety of different shapes and dimensions without departing from the spirit of the present disclosure.

The plate 1302 is disposed proximate to or at the proximal end 1110 of the body 1104. As discussed above, the plate 1302 may be considered as part of the head 1100, or alternatively, it can be its own component. In either instance, it forms part of the pivot hinge 1300 that allows for the head 1100 to move between the first and second configurations. In the illustrated embodiment, the plate 1302 has a generally trapezoidal shape with rounded corners. Alternatively, the plate 1302 can have any desired shape. The plate 1302 can be fixedly attached to the head 1100 at the proximal end 1115 of the head 1100. A portion of the plate 1302 can extend away from the fourth face 1127 of the head and a portion of the plate 1302 can extend away from the first face 1120 of the head 1100. The plate 1302 can be welded or otherwise mechanically fixed to the head 1100. Alternatively, the plate 1302 can be integral to the head 1100 and can be molded or otherwise formed together.

The plate 1302 includes a first face 1302a and an opposed second face 1302b. As shown, the first and second faces 1302a, 1302b of the plate 1302 have the largest surface area of all of the faces of the plate 1302. Similar to the body 1104, the first and second faces 1302a, 1302b, or other portions of the plate 1302, can have lightening holes formed therein to lighten the weight of the plate. When lightening holes or the like are formed in the plate, a person skilled in the art will understand that the faces 1302a, 1302b can still generally be considered to have the largest surface area of all surfaces of the plate, as the formation of the lightening holes, at least with respect to the present disclosure, are not considered to impact the definition of the surface area.

The first face 1302a of the plate 1302 can be disposed at an angle α relative to the first face 1120 of the head 1100. The first face 1302a of the plate 1302 can be at an angle of greater than 0 degrees and less than or equal to 90 degrees relative to the first face 1120 of the head 1100. In some exemplary embodiments, the angle α can be approximately in the range of about 45 degrees to about 90 degrees, approximately in the range of about 60 degrees to about 90 degrees, and approximately in the range of about 75 degrees to about 90 degrees. In one exemplary embodiment, the angle α is approximately 85 degrees, ±5 degrees. The value of the angle α can be chosen to improve the quality of the placement of the tool 1000 in a casting 1500 and/or to aid in the clean removal of the tool 1000 from the casting 1500 with the engagement adapter 1200.

As illustrated in FIGS. 2 and 3, the plate 1302 can also include an arcuate channel 1306 and a pivot aperture or hole 1308 formed therein. More particularly, the arcuate channel 1306 and the pivot aperture 1308 extend through a thickness of the plate 1300 from the first face 1302a to the second face 1302b. The arcuate channel 1306 can include a first terminal end 1306a and a second terminal end 1306b, which help define the first and second orientations of the head 1100 with respect to the engagement adapter 1200, as described in greater detail below. Each of the channel 1306 and the aperture 1308 are adapted to receive aspects or components of or otherwise associated with the engagement adapter 1200 to help form the pivot hinge 1300, as described further below. While in the illustrated embodiment the channel 1306 is arcuate, in other embodiments an equivalent channel may have a different configuration, including a channel that is not arcuate.

While a person skilled in the art will recognize that the engagement adapter 1200 can be many different size, shapes, and configurations, in FIG. 2 the engagement adapter is a rod that extends along a longitudinal axis A1. The rod 1200 includes a proximal portion 1200p that is configured to be either held by a user or connect to another operating component, e.g., an elongate pole, that can be operated by a user, and a distal portion 1200d that is configured to be coupled to the plate 1302 as part of the pivot hinge 1300.

The distal portion 1200d can have any number of configurations. In the illustrated embodiment the distal portion 1200 has a U-joint 1204 two opposed upright arms 1206, 1208 extending distally towards the head 1100. The U-joint 1204 can additionally include two transverse pins 1210, 1212 that extend between the two upright arms 1206, 1208. As shown, the pin 1212 is disposed in the arcuate channel 1306 and is configured to move or otherwise pass through the channel between the first and second terminal ends 1306a, 1306b. When the pin 1212 is disposed at the first terminal end 1306a, the head 1100 can be in the first orientation, and when the pin 1212 is disposed at the second terminal end 1306b, the head 1100 can be in the second orientation. Because the arcuate channel 1306 can have other configurations in other embodiments such that it is not necessarily arcuate and may include more than two terminal ends, the description of how the channel 1306 and pin 1212 interact is by no means limiting. More generally, the pin 1212 moves from a first location in the channel to a second location in the channel to move the head 1100 between the first and second configurations. Those locations can be, but do not have to be, terminal ends of a channel like the arcuate channel 1306.

As further shown, the pin 1210, also referred to as a pivot, is disposed in the pivot aperture 1308 and has a biasing element, as shown a torsional spring 1304, disposed thereon. The torsional spring 1304 is configured to apply a force to at least one of the body 1104, the plate 1300, and the rod 1200 to urge the head 1100 back to a designed configuration (e.g., first or second). In the illustrated embodiment, the torsional spring 1304 is configured to bias the head 1100 to the first, placement configuration. Other types of biasing elements can also be used, including other types of springs and other components capable of providing a biasing force to at least one of the body 1104, plate 1300, and rod 1200 to urge the head 1100 back to a designed configuration. Likewise, in some embodiments, the head 1100 can be biased to a second, engagement configuration.

More particularly related to the pivot hinge 1300, the pivot hinge enables the head 1100 to pivot about the axis A2 between a first orientation or configuration (the placement position/orientation/configuration) to a second orientation or configuration (the engagement position/orientation/configuration). In the illustrated embodiments of FIGS. 4B-4D, the first orientation is an orientation at which the head 1100 is inserted into the casting 1500 (FIGS. 4B and 4C), and the second orientation is an orientation at which the head 1100 is positioned so it can engage an internal surface of the casting 1500 (FIG. 4D). As described and illustrated herein, a plane defined by one of the first and second faces 1302a, 1302b of the plate 1302 can be rotated approximately 90 degrees with respect to the longitudinal axis A1 between the first orientation and the second orientation such that the longitudinal axis A1 would still intersect the plane that extends from one of the first and second faces 1302a, 1302b of the plate. The longitudinal axis A3 of the head 1100, meanwhile, can be substantially perpendicular to the longitudinal axis A1 in both the first and second configurations.

Movement between the first and second orientations can be achieved by applying a force to the head. One of many ways this can be achieved is by disposing a rope (or equivalent that is capable of applying a force to the head) through the attachment point 1102 and applying a force that causes the plate 1300 to rotate about the pin 1210, and thus the axis A2, in turn moving the pin 1212 through the arcuate channel 1306 from the first terminal end 1306a to the second terminal end 1306b. The shape of the arcuate channel 1306 can control the range of motion of the plate 1302 with respect to the rod 1200. In the illustrated embodiment, the range is approximately 90 degrees as the pin 1212 travels from the first terminal end 1306a to the second terminal end 1306b. Alternatively, the range of motion can be more than 90 degrees or less than 90 degrees. The torsion spring 1304 can be arranged on the pin 1210 such that as the plate 1302 is rotated in the direction R1, shown in FIG. 2, an unloading force is applied to the rod 1200 and the pivot hinge 1300 to urge the plate 1302 and the head 1100 in an opposite direction.

A proximal end 1202 of the rod 1200 can also have many different configurations. Generally the proximal end 1202 is configured to be removably and replaceably coupled to an additional component, such as a pole (e.g., elongate pole 1220 in FIG. 4B), that is operable by a user to manipulate or otherwise operate the tool 1000 from a greater distance away from the head 1100 than if the user held the rod 1200 directly to operate the tool 1000. Accordingly, one or more engagement features can be provided on, or otherwise associated with, the rod 1200. In the illustrated example, these engagement features include opposed pegs 1214 disposed proximate to the U-joint 1204 and a plurality of engagement apertures or holes 1216, any and all of which can correspond to complimentary mating features associated with such an additional component (e.g., pole). A person skilled in the art will appreciate many different ways by which the rod 1200 can be coupled to another component that is operable by a user to manipulate the tool 1000, and thus the disclosure of pegs 1214 and apertures 1216 is by no means limiting. Likewise, a pole is just one of many different components that can be coupled to the rod 1200 to allow a user to manipulate or otherwise control the tool 1000, and/or components thereof (e.g., rotating the head 1100 with respect to the rod 1200), and thus the description of the additional component being a pole does not limit the types of components that can be used to allow a user to operate the tool 1000 from a distance. Alternatively, or additionally, a user can hold the rod 1200 to manipulate or otherwise operate the tool 1000. This can be done using the illustrated embodiment, and/or one or more gripping features (e.g., grooves, handles, etc.) can be incorporated onto an outer surface of the rod 1200. The pegs 1214 and apertures 1216 can themselves serve as gripping features.

Materials used to form the various components of the tool 1000 can be any number of materials known to those skilled in the art. The materials are generally selected to provide strength and stability, particularly when used in conjunction with shipping containers. In some exemplary embodiments, the head 1100 (including the body 1104 and plate 1300) is made from solid titanium, steel, high strength aluminum, or other suitable material known to those skilled in the art, and the rod 1200 is made from metal or a high strength polymer. Further, while the illustrated embodiment provides one exemplary size and shape for the various components of the tool 1000, a person skilled in the art will recognize other sizes and shapes that can be used for such a tool 1000 without departing from the spirit of the present disclosure. Sizes and shapes can depend, at least in part, on the sizes and shapes of the objects (e.g., shipping containers and castings) with which the tool 1000 is being used. Although described herein with respect to being used with shipping containers and castings, a person skilled in the art will recognize many other objects with which the tool 1000 can be used and many methods and operations that can be performed with such a tool.

While many different sizes and shapes are possible, some exemplary dimensions for the tool 1000 when used in context of shipping containers include the head 1100 having the length L1 approximately in the range of about 2.5 inches to about 3.5 inches, the width W1 approximately in the range of about 1.5 inches to about 2 inches, the width W2 approximately in the range of about 2.5 inches to about 3.5 inches, the height H1 approximately in the range of about 0.25 inches to about 0.75 inches, a distance between the terminal ends 1140, 1142 of the tabs 1128, 1130 and the respective face 1122 from which they extend away can be approximately in the range of about 0.25 inches to about 0.625 inches, and the length L4 of the tabs 1128, 1130 can be approximately in the range of about 0.25 inches to about 0.5 inches. Some exemplary dimensions for other labeled lengths of the tool 1000 include a length L2 approximately in the range of about 0.5 inches to about 1.25 inches, a length L3 approximately in the range of about 0.5 inches to about 1.25 inches, and the length L5 approximately in the range of about 0.125 inches to about 0.5 inches. The dimensions of the plate 1300 are less critical for purposes of engaging a shipping container than at least some of the dimensions of the body 1104 since the plate 1300 is not the primary way by which the tool engages a shipping containers, but a person skilled in the art, in view of the present disclosures, can derive suitable dimensions for the plate 1300 and other components of the tool. In some exemplary embodiments, the rod 1200 has a length approximately in the range of about 4 inches to about 6 inches, and a diameter approximately in the range of about 0.25 inches to about 0.75 inches. In one exemplary embodiment of the tool 1100, the length L1 is approximately 3 inches, the length L2 is approximately 1 inch, the length L3 is approximately 1.125 inches, the length L4 is approximately 0.5 inches, the length L5 is approximately 0.3 inches, the width W1 is approximately 1.85 inches, the width W2 is approximately 2.8 inches, the height H1 is approximately 0.4 inches, a distance between the terminal ends 1140, 1142 of the tabs 1128, 1130 and the face 1122 is approximately 0.4 inches, a length of the rod 1200 is approximately 4.4 inches, and a diameter of the of the rod 1200 is approximately 0.5 inches.

An exemplary method of using tools of the nature described above with respect to the tool 1000 is now described with reference to FIGS. 4A-4F. As described above, with reference to FIG. 1, shipping containers 10 are often stacked many containers high. The uppermost containers 10 can be upwards of approximately 70 feet, or more, high. In the event that a container needs to be accessed during transport, for example, it may not be possible to unstack the containers to bring the needed container 10 to ground level. The shipping containers 10 often include standard corner castings 1500. Each casting 1500 can include an upper or lower opening 1502 that can be used to lock the container to a surface above or below the container 10 with, for example, a twistlock. The casting 1500 can additionally include side openings 1504, 1506 that can be used to secure the container 10 to adjacent containers, again with a twistlock or other securing means. The side openings 1504, 1506 can include rounded bottom portions 1504*a*, 1506*a*. Often, at least one of the two side openings 1504, 1506 are left free.

Figure 4A:
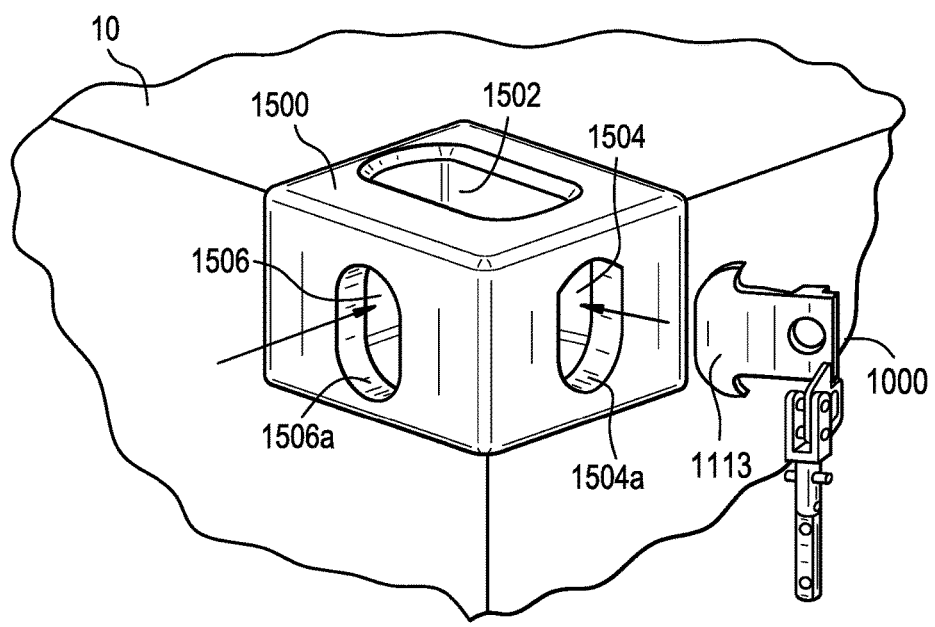
FIGS. 4A-4F are perspective, schematic views of one exemplary method of using the tool of FIG. 2 in conjunction with the casting provided for in FIG. 1A.
Figure 4B:
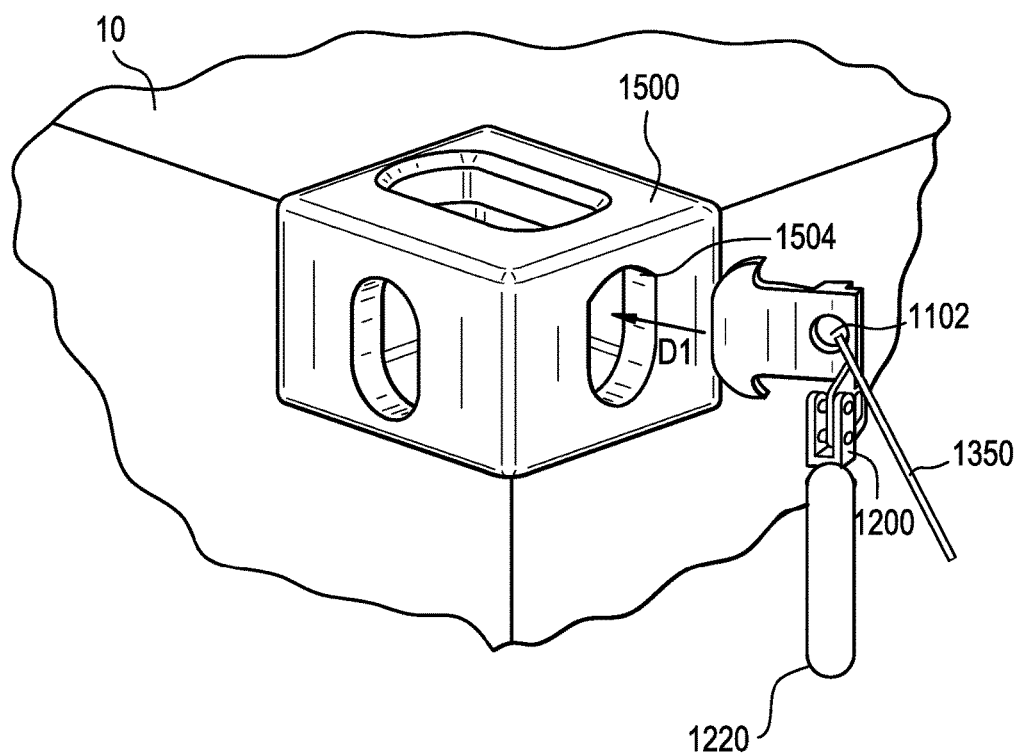
Figure 4C:
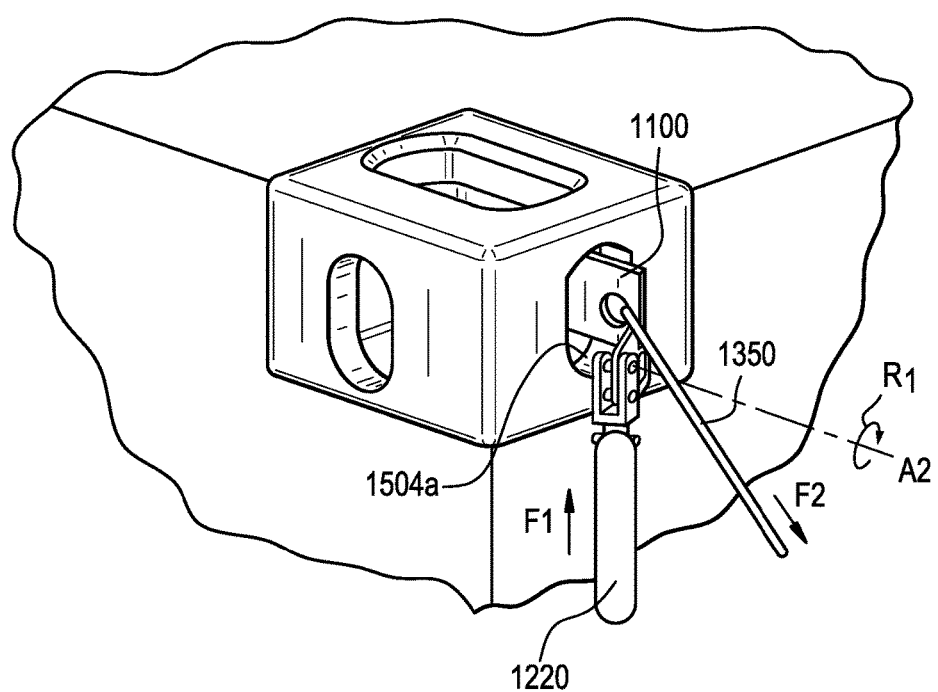
Figure 4D:
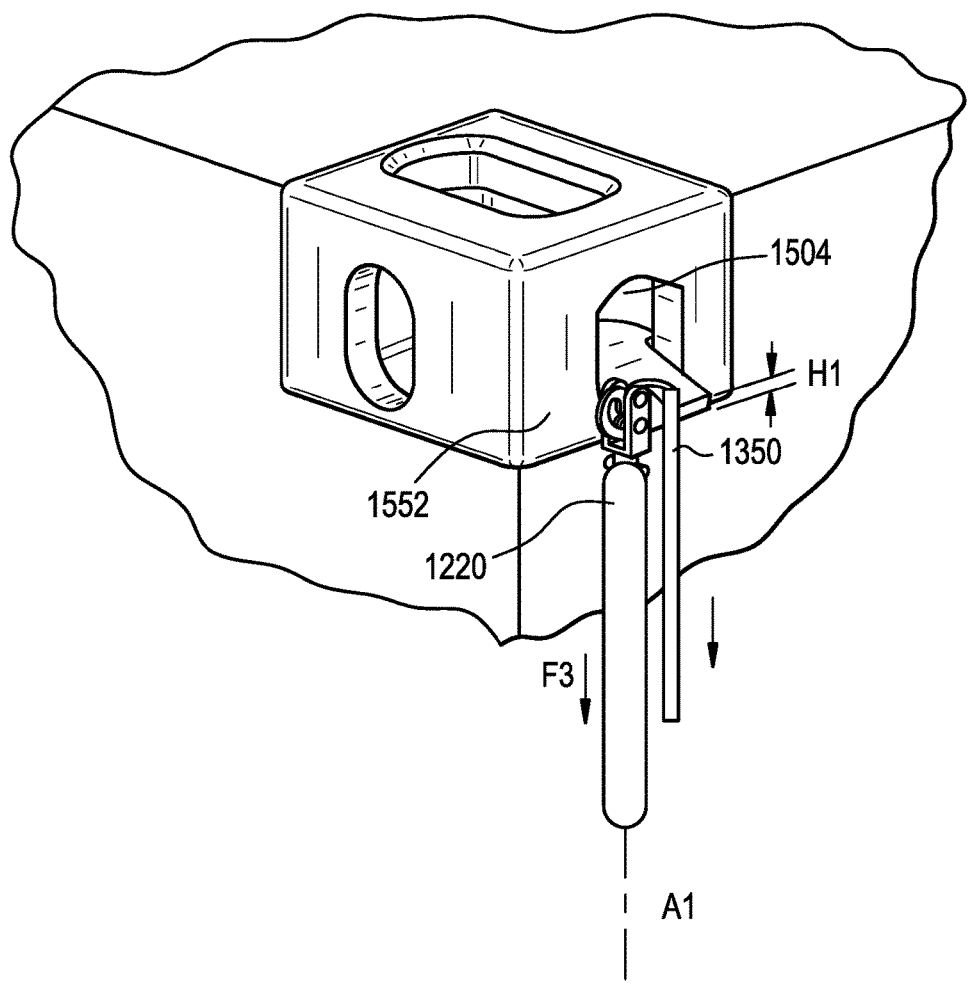

As shown in FIG. 4A, the distal, or attachment, end 1113 of the head 1100 can be inserted into a free opening 1504. While not shown, opening 1506 can be occupied by a twistlock which can take up internal space within the casting 1500. In one exemplary embodiment, as shown in FIG. 4B, the tool 1000 can be lifted up to the container casting 1500 with a pole 1220 that telescopically receives the rod 1200. In one embodiment the pole 1220 can be a fixed length. In an alternative embodiment, the pole 1220 can be a telescoping pole such that a user can adjust the length of the pole 1220 to allow for the tool 1000 to be inserted into a casting 1500 at any required height. While the pole 1220 is often tubular in nature, a person skilled in the art will recognize that the pole can be any number of shapes, including but not limited to any polygonal prism (e.g., square, rectangular, pentagonal, hexagonal, octagonal, trapezoidal, etc.). At any point while using the tool 1000, the rod 1200 can be operated by the user to manipulate or otherwise control the head 1100 without an outside component such as pole. As shown in FIGS. 4A-4C, when the head 1100 is inserted into the opening 1504 of the casting 1500, each of a longitudinal axis of the engagement adapter 1200 and a width of the head 1100 is approximately parallel to the height of the casting. A person skilled in the art, in view of the present disclosures, would understand that many orientations of the head 1100 and or the rod 1200 during insertion into the opening 1504 of the casting 1500 are possible. By way of non-limiting example, one or both of the longitudinal axis of the engagement adapter 1200 and the width of the head 1100 can be disposed at an angle with respect to the height of the casting during insertion. As a result, the respective longitudinal axis of the engagement adapter 1200 and the width of the head 1100 can be diagonally dispose to the height of the casting 1500. The angle formed by the longitudinal axis of the engagement adapter 1200 and/or the width of the head 1100 and the height of the casting can be, for example, approximately in the range of about 1 degrees to about 45 degrees, although this angle depends, at least in part, on the configuration of the insertion end of the head 1100 and the configuration of the opening 1504.

As noted above, the head 1100 of the tool 1000 can include a rope 1350, or other component suitable to apply a force to the head 1100 to initiate its rotation, attached through the universal attachment point 1102. The pole 1220, having the tool 1000 on a distal end, can be advanced up to the casting 1500. The pole 1220 and the tool 1000 can be advanced in the direction D1 towards and into the opening 1504, as shown in FIGS. 4B and 4C. Advantageously, the tool 1000 can be inserted into the casting 1500 even when there is a lock or other structure, not shown, inserted in the other opening 1506.

As shown in FIG. 4C, the tool 1000 can be inserted into the opening 1506 of the casting 1500 in a first orientation or configuration. In order to actuate the head 1100 of the tool 1000 into the second orientation or configuration, as shown in FIG. 4D, at least one of a force F1 can be applied in a distal, or upward, direction to the pole 1220 and a force F2 can be applied in a proximal, or downward, direction to the rope 1350, thereby rotating the head 1100 in a direction R1 about the pin 1210 and the axis A2. The amount that the head 1100 can pivot can be controlled by the travel path of the arcuate channel 1306 (or other shaped channel, including those that are not arcuate). As the head 1100 is pivoted from the first configuration, the rounded edges 1126 of the head 1100 can slide within the opening to facilitate good placement of the rounded edges 1126 of the head 1100 on the rounded bottom 1504*a* of the opening 1504.

Figure 4E:
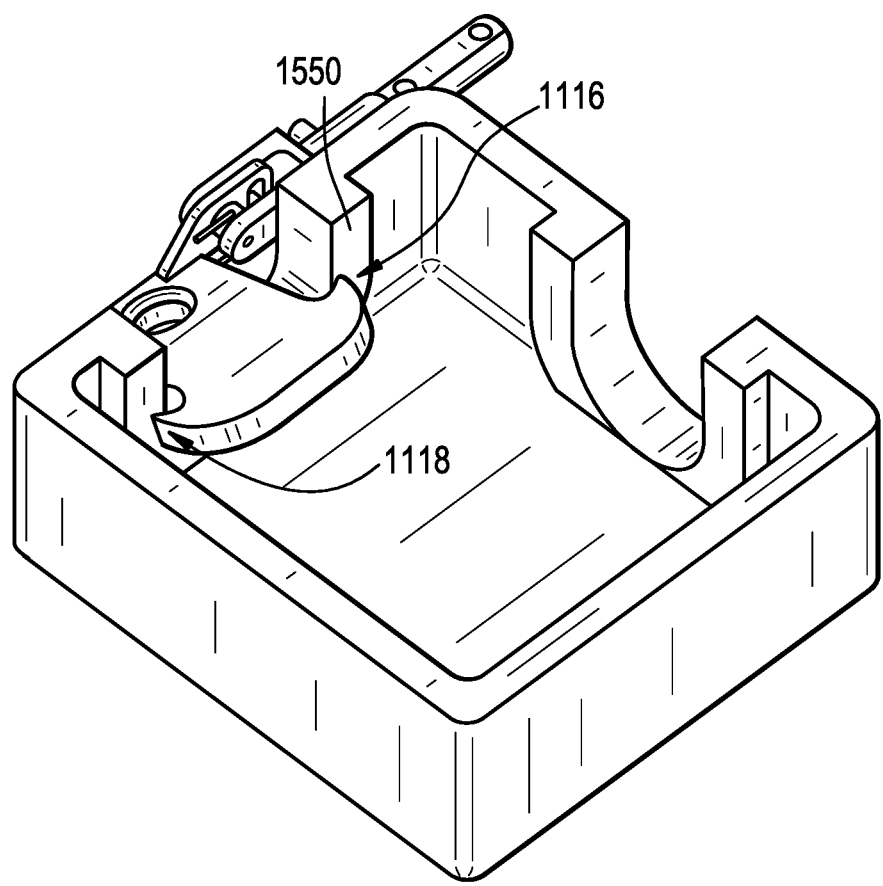

In the illustrated embodiment, the head 1100 is rotated such that the longitudinal axis A1 of the rod 1200 is substantially perpendicular to the height H1 of the head 1100. Notably, while in FIGS. 4D-4F a plane defined by a face of the head appears to be a bit angled, this is because the forces, such as the force supplied by the rope 1350, are applied near the proximal-most end 1110 of the head 1100, and thus causes the distal-most end 1112 of the head 1100 to deflect upwards towards the top of the casting 1500. Nevertheless, a person skilled in the art would generally consider the head 1100 to be substantially perpendicular to the rod 1200 as shown. When the head 1100 has been pivoted in the direction R1, a force F3 can be applied to both the rope 1350 and the pole 1220 to secure the head 1100 in the casting 1500. The force F3 can cause the top hook corners 1116, 1118 of the head 1100 to bite, or engage the inside face 1550 of the casting, as shown in FIG. 4E. Additionally, the angled faces 1132, 1134 of the tabs 1128, 1130 can engage the outer face 1552 of the casting 1500 to prevent the head 1100 from over rotating or tipping within the opening 1504. In some cases, over rotation or over tipping of the head 1100 within the opening 1504 can prevent the head 1100 from properly engaging the inside face 1550 of the casting 1500. When the head is tipped, as shown in FIGS. 4D and 4E, such that the top hook corners 1116, 1118 are biting into the inside face 1550 of the casting 1500, and the angle faces 1132, 1134 of the tabs 1128, 1130 are engaged against the outer face 1552 of the casting 1500, the head 1100 can be said to be in a locked configuration (among other names for this configuration provided for herein, e.g., engagement configuration/orientation/position). Advantageously, the angled faces 1132, 1134 of the tabs 1128, 1130 and the rounded edges 1126 of the head 1110 can aid in self-correcting the engagement of the head 1100 with the casting 1500 when loads are applied to the device.

Figure 4F:
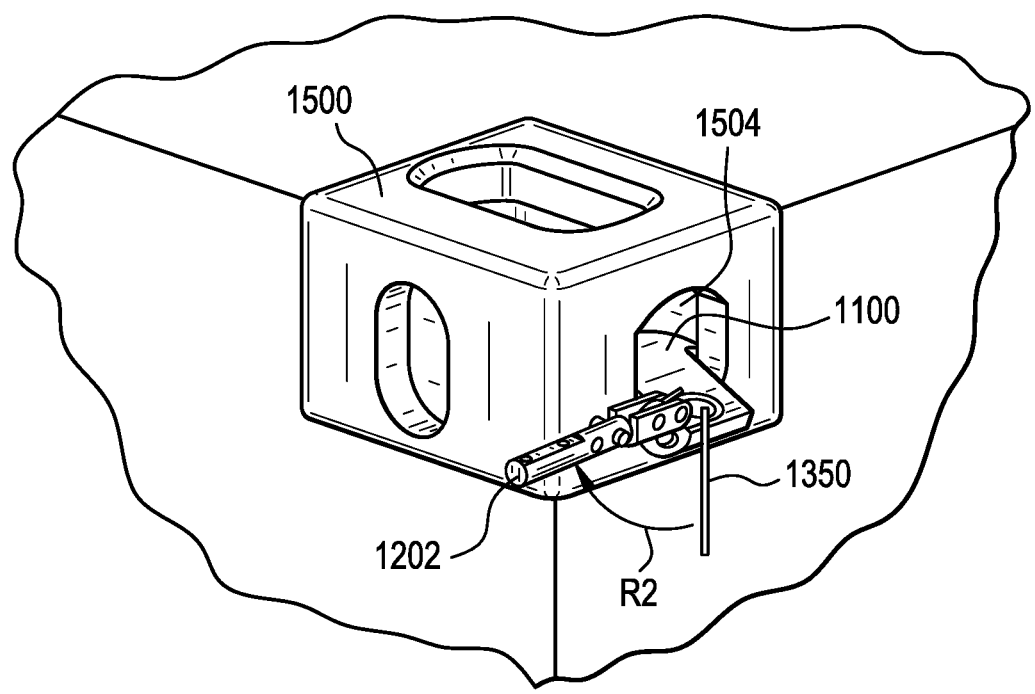

When the head 1100, and thus the tool 1000, is properly engaged in the casting 1500 in a locked configuration, as shown in FIGS. 4D and 4E, a number of different actions can be performed with respect to the tool 1000 and/or the container, including various climbing, hauling, lifting, and rescuing tasks that are common actions for managing shipping containers. At least in some instances, it may be advantageous to perform such actions without the pole 1220, and thus the pole 1220 can be disengaged from the rod 1200. For example, when the tool 1000 is secured to the casting 1500, the rod can be rotated in the direction R2, approximately 90 degrees as shown in FIG. 4F, such that the rod 1200 is out of the way of the rope 1350 and can be used as a step or support.

The rod 1200 can be urged to rotate by the torsion spring 1304. The rope 1350, or other ascent device, can then be used by an operator to reach the container 10. When the operator is finished climbing the rope 1350, a pole 1220 can be reattached to the rod 1200 and an upward force can be applied to the pole to disengage the head 1100 from the casting 1500. In some embodiments, the operator can ascent up part way up the container stack, and using an additional tool 1000, lock in a second tool higher up in the stack of containers. This may be helpful when it is not possible to have a pole 1220 that is long enough to reach the top of a container stack. A person skilled in the art, in view of the present disclosure, will understand a variety of actions that can be performed using the tool 1000 with respect to shipping containers. While the general actions themselves (e.g., climbing, hauling, lifting, and rescuing) are known as actions that can be performed in conjunction with intermodal containers, the use of the tool 1000, and associated methods, for performing such tasks results in improved ways to perform these methods—such ways not being possible without the present disclosure.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A tool, comprising:
   a head having an attachment end with one or more engagement features configured to engage an object to set a position of the head with respect to the engaged object and an opposed control end having an aperture extending through opposed first and second faces of the head, the first and second faces having the largest surface areas of all faces of the head, and third and fourth faces of the head extending between the first and second faces;
   a plate having opposed first and second faces, the first and second faces of the plate having the largest surfaces areas of all faces of the plate, and the plate being attached to the head at an attachment location such that a substantial portion of the attachment location is positioned closer to an edge of the head on the opposed control end than a center of the head, and the plate being fixedly disposed with respect to the first face of the head such that an angle formed between the first face of the head and the first face of the plate is greater than 0 degrees and less than or equal to 90 degrees;
   an engagement adapter having a distal end to which the plate is pivotally coupled; and
   a biasing element disposed on a portion of the engagement adapter and configured to apply a force to at least one of the head, the plate, and the engagement adapter,
   wherein the head is configured to be pivoted between a first configuration in which a plane defined by the first face of the head is substantially parallel to a longitudinal axis of the engagement adapter, and a second configuration in which the plane defined by the first face of the head forms an approximate right angle with the longitudinal axis of the engagement adapter.

2. The tool of claim 1,
   wherein the plate further comprises both an aperture and a channel formed therein that each extends through the opposed first and second faces of the plate, and
   wherein the engagement adapter further comprises a pivot and a pin associated therewith, the pivot being disposed through the aperture of the plate and the pin being disposed in the channel of the plate such that the pin moves from a first location of the channel to a second location of the channel as the head moves from the first configuration to the second configuration.

3. The tool of claim 2, wherein the biasing element is disposed on the pivot of the engagement adapter.

4. The tool of claim 1, further comprising a rope disposed through the aperture of the head and being operable to apply a force to the head to pivot the head from the first configuration to the second configuration.

5. The tool of claim 1, wherein the head further comprises at least one tab, the at least one tab having a terminal end that extends away from the second face of the head in a direction that is opposite to a direction from which a terminal end of the plate extends away from the first face of the head.

6. The tool of claim 5, wherein a third face of the plate that extends between the first and second faces of the plate further comprises a rounded corner formed therein, the rounded corner being disposed adjacent to the at least one tab.

7. The tool of claim 1, wherein a proximal end of the engagement adapter is configured to be removably and replaceably coupled to an elongate pole.

8. The tool of claim 1, wherein the one or more engagement features of the attachment end of the head further comprises opposed hooked ends in which a distance extending between terminal ends of the opposed hooked ends is greater than a more proximal width of the first face of the head, the width of the first face being measured in the same direction along which the distance extending between the terminal ends of the opposed hooked ends are measured.

9. The tool of claim 1, wherein the plate is attached to the head such that a portion of the plate laterally extends directly away from the first face of the head and a portion of the plate laterally extends directly away from the fourth face of the head.

10. The tool of claim 1, wherein the plate is attached to the head such that the plate contacts the first face of the head in a single quadrant of the first face of the head.

11. The tool of claim 1, wherein the plate is attached to the head such that the plate contacts the head on at least two of the first, second, third, and fourth faces of the head.

12. The tool of claim 1, wherein the plate is configured to rotate 90 degrees between the first configuration and the second configuration such that the longitudinal axis of the engagement adapter intersects a plane that extends from one of the first and second faces of the plate in both the first configuration and the second configuration.

13. A tool, comprising:
    a head having a first portion that includes an attachment end with one or more engagement features configured to engage an object to set a position of the head with respect to the engaged object and an aperture formed thereon, and a second portion having a coupling end, the coupling end including an arcuate channel formed in a surface of the head, the aperture of the first portion being disposed closer to the coupling end than the attachment end, and the aperture extending through a thickness of the head;
    an engagement adapter having a pivot and a pin, the head being pivotally coupled to the engagement adapter at the coupling end such that the head pivots about the pin, and the pin being disposed in the arcuate channel such that the pin is configured to move from a first terminal end of the arcuate channel to a second opposite terminal end of the arcuate channel, causing the coupling end to rotate about the pivot between approximately 30 degrees and approximately 90 degrees; and
    a rope disposed through the aperture and being operable to apply a force to the head to move the pin from the first terminal end of the arcuate channel to the second terminal end of the arcuate channel.

14. The tool of claim 13, wherein the head comprises a first plate that includes at least a portion of the attachment end and a second plate that is angularly disposed with respect to the first plate, the second plate including at least a portion of the coupling end.

15. The tool of claim 14, wherein an angle formed between a face of the first plate and a face of the second plate is greater than 0 degrees and less than or equal to 90 degrees, with the faces of the first and second plates being faces that face each other and include one of the two faces of each plate that has the greatest surface area of the faces for that particular plate.

16. The tool of claim 15, wherein the head further comprises at least one tab extending from a surface of the first plate, the at least one tab having a terminal end that extends away from the surface of the first plate in a direction that is opposite to a direction from which a terminal end of the second plate extends away from the face of the first plate.

17. The tool of claim 16, wherein a second face of the first plate that extends substantially perpendicular to the first face of the first plate further comprises a rounded corner formed therein, the rounded corner being disposed adjacent to the at least one tab.

18. The tool of claim 13, further comprising a biasing element disposed on the pivot and configured to apply a force to at least one of the head and the engagement adapter.

19. The tool of claim 13, wherein a proximal end of the engagement adapter is configured to be removably and replaceably coupled to an elongate pole.

20. The tool of claim 13, wherein the one or more engagement features of the attachment end further comprises opposed hooked ends.

21. A tool, comprising:
a head having an attachment end with one or more engagement features configured to engage an object to set a position of the head with respect to the engaged object and an opposed control end having an aperture extending through opposed first and second faces of the head, the first and second faces having the largest surface areas of all faces of the head;
a plate having opposed first and second faces, the first and second faces of the plate having the largest surfaces areas of all faces of the plate, and the plate being attached to the head at an attachment location such that a substantial portion of the attachment location is positioned closer to an edge of the head on the opposed control end than a center of the head, and the plate being fixedly disposed with respect to the first face of the head such that an angle formed between the first face of the head and the first face of the plate is greater than 0 degrees and less than or equal to 90 degrees;
an engagement adapter having a distal end to which the plate is pivotally coupled; and
a biasing element disposed on a portion of the engagement adapter and configured to apply a force to at least one of the head, the plate, and the engagement adapter,
wherein the head is configured to be pivoted between a first configuration and a second configuration, and the plate is configured to rotate approximately 90 degrees between the first configuration and the second configuration such that a longitudinal axis of the engagement adapter intersects a plane that extends from one of the first and second faces of the plate in both the first configuration and the second configuration.

22. The tool of claim 21, wherein the plate is attached to the head such that a portion of the plate laterally extends directly away from the first face of the head and a portion of the plate laterally extends directly away from a fourth face of the head, the fourth face extending between the first and second faces of the head.

23. The tool of claim 21, wherein the plate is attached to the head such that the plate contacts the head in a single quadrant of the first face of the head.

24. The tool of claim 21,
wherein the head further comprises third and fourth faces extending between the first and second faces of the head, and
wherein the plate is attached to the head such that the plate contacts the head on at least two of the first, second, third, and fourth faces of the head.

* * * * *